(12) United States Patent
Lee (10) Patent No.: US 12,132,346 B2
(45) Date of Patent: Oct. 29, 2024

(54) UPS MODULE AND UPS MODULE CONTROL METHOD

(71) Applicant: LS ELECTRIC CO., LTD., Anyang-si (KR)

(72) Inventor: Yoonmin Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 287 days.

(21) Appl. No.: 17/755,962

(22) PCT Filed: Mar. 18, 2020

(86) PCT No.: PCT/KR2020/003677
§ 371 (c)(1),
(2) Date: May 12, 2022

(87) PCT Pub. No.: WO2021/095999
PCT Pub. Date: May 20, 2021

(65) Prior Publication Data
US 2022/0385100 A1     Dec. 1, 2022

(30) Foreign Application Priority Data
Nov. 13, 2019 (KR) .................. 10-2019-0145256

(51) Int. Cl.
*H02J 9/06* (2006.01)
*H02J 7/00* (2006.01)

(52) U.S. Cl.
CPC ............ *H02J 9/061* (2013.01); *H02J 7/0048* (2020.01); *H02J 2207/20* (2020.01); *H02J 2207/50* (2020.01)

(58) Field of Classification Search
CPC ...... H02J 9/061; H02J 7/0048; H02J 2207/20; H02J 2207/50
See application file for complete search history.

(56) References Cited

FOREIGN PATENT DOCUMENTS

| CN | 105576813 A | 5/2016 |
|---|---|---|
| JP | 2836286 B2 | 12/1998 |
| JP | H11202985 A | 7/1999 |

(Continued)

OTHER PUBLICATIONS

Office Action for related Japanese Application No. 2022-527179; action dated Apr. 18, 2023; (3 pages).

(Continued)

*Primary Examiner* — Daniel Cavallari
(74) *Attorney, Agent, or Firm* — K&L Gates LLP (57) ABSTRACT

The present disclosure comprises an alternating current-to-direct current converter for converting a commercial power current; a direct current-to-direct current converter for converting a battery current; a common output end at which the output end of the alternating current-to-direct current converter and the output end of the direct current-to-direct current converter are connected through a link capacitor having a preset bus voltage; a first circuit breaking part for opening or closing the current path between the common output end and a load; a second circuit breaking part for opening or closing the current path between the commercial power and the alternating current-to-direct current converter; a third circuit breaking part for opening or closing the current path between the battery and the direct current-to-direct current converter; and a control unit.

13 Claims, 4 Drawing Sheets

(56) References Cited

FOREIGN PATENT DOCUMENTS

| JP | 2009044794 A | 2/2009 |
|----|--------------|--------|
| JP | 2010161864 A | 7/2010 |
| JP | 2019129675 A | 8/2019 |
| JP | 2019180131 A | 10/2019 |
| KR | 20060086630 A | 8/2006 |

OTHER PUBLICATIONS

International Search Report for related International Application No. PCT/KR2020/003677; report dated May 20, 2021; (5 pages).
Written Opinion for related International Application No. PCT/KR2020/003677; report dated May 20, 2021; (4 pages).
Notice of Allowance for related Korean Application No. 10-2019-0145256; action dated Jun. 25, 2021; (2 pages).
Office Action for related Korean Application No. 10-2019-0145256; action dated Jun. 25, 2021; (5 pages).

UPS MODULE AND UPS MODULE CONTROL METHOD

CROSS-REFERENCE TO RELATED APPLICATIONS

This application is the National Stage filing under 35 U.S.C. 371 of International Application No. PCT/KR2020/003677, filed on Mar. 18, 2020, which claims the benefit of earlier filing date and right of priority to Korea utility model Application No. 10-2019-0145256 filed on Nov. 13, 2019, the contents of which are all hereby incorporated by reference herein in their entirety.

FIELD

The present invention relates to an uninterruptible power source (UPS) module and a UPS module control method.

BACKGROUND

Currently, industrial systems tend to be advanced along with the development of technology, and automated and high-speed industrial equipment is being operated according to these advanced industrial systems.

When a problem occurs in a power system for supplying power to industrial equipment due to the automation and speeding-up of the industrial equipment, enormous damage may occur due to a power outage. Also, the damage may be further increased because the problem of the power system may cause damage to the industrial equipment that receives power.

Therefore, by introducing an uninterruptible power source (UPS) module that supplies alternative power to a load, that is, industrial equipment using a battery charged with a certain amount of current when a problem in the power system such as a sudden power outage or an abnormal electric current occurs, it is possible to ensure that stable power can be supplied even if an abnormality occurs in the power system of a commercial power source.

Typically, it is common for such a UPS module to have a dual structure including a commercial power source module connected to a commercial power source and configured to supply electric current applied from the commercial power source to a load and a battery module connected to a battery power source and configured to supply electric current applied from a battery to a load. In the case of a UPS module having such a dual structure, a commercial power source module and a battery module may be controlled by respective independent control units.

However, when the UPS module is controlled in the integrated form of the dual module, the structure and control of the UPS module may be complicated. Also, such a complex structure and control causes a delay in the time it takes for the UPS module to connect an alternative power source (battery) when there is a problem with the commercial power source, and thus may be a factor that inhibits uninterrupted power supply.

In order to solve these problems, research is actively underway to simplify the structure and control of a UPS module by unifying the UPS module.

Meanwhile, when one UPS module is used, the UPS module is solely responsible for the current to be supplied to a load, which results in an increase in the current load. In addition, if only one UPS module is used, the UPS function cannot be maintained when the UPS module is being repaired or is broken.

Accordingly, research is actively underway to enable a plurality of UPS modules to be connected together so that the current load can be reduced and also the UPS function can be implemented even when any one UPS module is being repaired or is broken.

SUMMARY

An object of the present invention is to provide an uninterruptible power source (UPS) module in which a commercial power source module and a battery module are integrated, and a control method for the UPS module.

Also, another object of the present invention is to provide a UPS module that can be connected to a load together with another UPS and a method of controlling the UPS module so that the UPS can be connected to another UPS.

According to an aspect of the present invention for achieving the above or other objects, an uninterruptible power source (UPS) module according to an embodiment of the present invention includes an alternating current (AC) to direct current (DC) converter configured to convert an alternating current of a commercial power source into a direct current, a DC-to-DC converter configured to convert a direct current of a battery into a direct current having a different voltage, a common output terminal to which an output terminal of the AC-to-DC converter and an output terminal of the DC-DC converter are connected through a link capacitor having a preset bus voltage, a first circuit breaking part formed between the common output terminal and a load and configured to open or close a circuit between the common output terminal and the load, a second circuit breaking part configured to open or close a circuit between the commercial power source and the AC-to-DC converter, a third circuit breaking part configured to open or close a circuit between the battery and the DC-to-DC converter, an initial charging part configured to charge the link capacitor, and a control unit configured to close the first circuit breaking part to connect the common output terminal and the load when the UPS module is started, control the initial charging part to charge the link capacitor, and sequentially close the second circuit breaking part and the third circuit breaking part when the bus voltage is formed along with the charging of the link capacitor.

In an embodiment, the initial charging part includes a first charging part configured to receive an alternative current and charge the link capacitor and a second charging part configured to receive a direct current and charge the link capacitor.

In an embodiment, the first charging part is formed to receive any single-phase current out of a multi-phase alternating current supplied from the commercial power source and charge the link capacitor, and the second charging part is formed to receive a current of a positive terminal out of output terminals of the UPS module connected to the load and charge the link capacitor.

In an embodiment, the control unit controls the initial charging part such that the link capacitor is charged through another charging part according to whether there is a direct current supplied to the load when the UPS module is started.

In an embodiment, the control unit controls the initial charging part such that the link capacitor is charged through the first charging part when there is no current supplied from other UPS modules to the load when the UPS module is started and controls the initial charging part such that the link capacitor is charged through the second charging part when there is a current supplied from other UPS modules to the load.

In an embodiment, when the second circuit breaking part is closed to connect the circuit between the commercial power source and the AC-to-DC converter, the control unit turns off the initial charging part to stop supplying the current to the link capacitor before the third circuit breaking part is closed, and when the initial charge unit is turned off, the control unit closes the third circuit breaking part to connect the circuit between the battery and the DC-to-DC converter.

In an embodiment, the control unit drives the DC-to-DC converter in a standby state when both the first circuit breaking part and the second circuit breaking part are closed and controls the DC-to-DC converter to convert the direct current of the battery into a direct current having the bus voltage when the second circuit breaking part is opened while the first circuit breaking part is closed.

In an embodiment, the UPS module further includes a discharging part configured to discharge the charging voltage of the link capacitor, wherein the first to third circuit breaking parts are all opened, the control unit connects the discharging part to the link capacitor to discharge the current charged in the link capacitor.

According to an aspect of the present invention for achieving the above or other objects, a method of controlling an uninterruptible power source (UPS) module according to an embodiment of the present invention includes a first operation of controlling a first circuit breaking part formed between an output terminal of the UPS module and a load to connect the output terminal of the UPS module and the load when the UPS module is started, a second operation of charging a link capacitor to a preset bus voltage by controlling an initial charging part for charging the link capacitor, a third operation of controlling a second circuit breaking part formed between a commercial power source and an alternating current (AC) to direct current (DC) converter for converting an alternating current input from the commercial power source into a direct current to connect the commercial power source and the AC-to-DC converter when the link capacitor is charged to the bus voltage, a fourth operation of turning off the initial charging part to stop supplying the current to the link capacitor when the commercial power source and the AC-to-DC converter are connected; a fifth operation of controlling the AC-to-DC converter to convert the alternating current of the commercial power source into a direct current having a voltage corresponding to the bus voltage; a sixth operation of controlling a third circuit breaking part formed between a battery and a DC-to-DC converter for converting a direct current input from the battery into a direct current having a voltage corresponding to the bus voltage to connect the battery and the DC-to-DC converter; and a seventh operation of driving the DC-to-DC converter in a standby state when the DC-to-DC converter and the battery are connected.

In an embodiment, the second operation includes a second-one operation of determining whether there is a direct current supplied to the load; and a second-two operation of controlling the initial charging part when there is a direct current supplied to the load to charge the link capacitor with the direct current supplied to the load and controlling the initial charging part when there is no direct current supplied to the load to charge the link capacitor with the alternating current supplied from the commercial power source.

In an embodiment, the method further includes an eighth operation of controlling the DC-to-DC converter to convert the direct current of the battery into a direct current having the bus voltage when the second cutoff is opened to cut off the commercial power source, a ninth operation of further detecting whether the commercial power source is recovered when the current of the battery is converted into a direct current having another voltage through the DC-to-DC converter, a tenth operation of closing the first circuit breaking part to connect the commercial power source and the AC-to-DC converter when the commercial power source is recovered; and an eleventh operation of recovering the DC-to-DC converter to a standby state.

In an embodiment, the ninth operation includes a ninth-one operation of further detecting a discharge state of the battery, a ninth-two operation of opening the first circuit breaking part to cut off an output terminal of the UPS module from the load according to the discharge state of the battery, a ninth-three operation of opening the third circuit breaking part to cut off the battery from the DC-to-DC converter when the first circuit breaking part is opened, and a ninth-four operation of connecting a discharging part including at least one resistor or ground to the link capacitor to discharge the voltage charged in the link capacitor when the third circuit breaking part is opened.

In an embodiment, the tenth operation includes a tenth-one operation of controlling the initial charging part to charge the link capacitor to a preset bus voltage when the commercial power source is recovered and a tenth-two operation of controlling the second circuit breaking part to connect the commercial power source and the AC-to-DC converter when the link capacitor is charged to the bus voltage.

The effects of the UPS module and the control method of the UPS module according to the present invention will be described as follows.

According to at least one of the embodiments of the present invention, by performing control such that a load is connected to a commercial power source or a battery through one control unit, it is possible to simplify the structure of the UPS module and make the control easier.

Also, according to at least one of the embodiments of the present invention, by allowing a plurality of UPS modules to be connected to a load and allowing the UPS modules to be easily detachable, it is possible to implement a UPS function even when any one UPS module fails or is being serviced.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
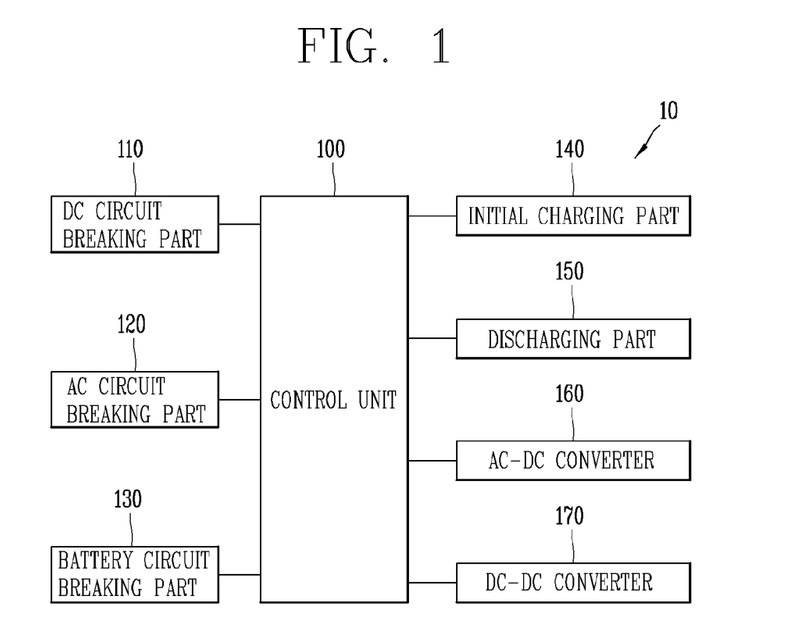
FIG. 1 is a block diagram illustrating each component of an uninterruptible power source (UPS) module according to an embodiment of the present invention.

First, FIG. 1 is a block diagram illustrating each component of an uninterruptible power source (UPS) module according to an embodiment of the present invention.

Referring to FIG. 1, a UPS module 10 according to an embodiment of the present invention may be configured to include a control unit 100 and a direct current (DC) circuit breaking part 110, an alternating current (AC) circuit breaking part 120, a battery circuit breaking part 130, an initial charging part 140, a discharging part 150, an AC-to-DC converter 160, and a DC-to-DC converter 170 connected to the control unit 100 and controlled by the control unit 100.

First, the DC circuit breaking part 110 may be a circuit breaking part formed on an output terminal through which direct current (DC) is output from the UPS module according to an embodiment of the present invention to a load. The DC circuit breaking part 110 may include at least one DC cutoff configured to cut off the UPS module from the load to protect the load and the internal circuit when an abnormality occurs in the UPS module.

Meanwhile, the AC circuit breaking part 120 may include at least one AC cutoff configured to cut off a commercial power source to protect the internal circuit from an overcurrent, an arc fault, or the like when an abnormal condition such as a short-circuit occurs in alternating current (AC) (three-phase (R, S, T) AC current) input from the commercial power source.

Meanwhile, the battery circuit breaking part 130 may include at least one DC cutoff configured to cut off a battery to protect the internal circuit from an overcurrent, an arc fault, or the like when an abnormal condition occurs in the battery.

Meanwhile, the AC or DC cutoff included in the DC circuit breaking part 110, the AC circuit breaking part 120, or the battery circuit breaking part 130 may be configured to include at least one molded cutoff (MCCB) or air cutoff (ACB). Also, in the following description, a corresponding circuit is closed and thus connected when each of the circuit breaking parts is turned on and is opened and thus short-circuited or cut off when each cutoff is turned off.

Meanwhile, the AC-to-AC converter 160 may be a converter that is connected to the commercial power source to convert a three-phase alternating current input from the commercial power source into a direct current. The AC-to-DC converter 160 may include a bridge rectifying circuit to which a plurality of rectifiers are connected. The rectifiers may be diodes or silicon controlled rectifiers (SCR). In the following description, it is assumed that the rectifiers are diodes for convenience of description.

Also, the DC-to-DC converter 170 may be a converter that is connected to a battery to convert a direct current having a primary voltage input from the battery into a direct current having a secondary voltage. The secondary voltage is higher than the primary voltage and may be a voltage such as the DC voltage output from the AC-to-DC converter 160. In this case, the output terminal voltage of the AC-DC converter 160 may be a preset bus link voltage. By converting a high-voltage current output from the battery into the current having the bus link voltage, the DC-to-DC converter 170 may be formed such that the output terminal of the AC-to-DC converter 160 and the output terminal of the DC-to-DC converter 170 are connected to each other.

Meanwhile, the UPS module according to an embodiment of the present invention may include a DC link capacitor to connect the output terminal of the AC-to-AC converter 160 and the output terminal of the DC-to-DC converter 170 to each other through the bus link voltage.

The UPS module 10 according to an embodiment of the present invention may include the initial charging part 140 to charge the DC link capacitor. The initial charging part 140 may include at least one resistor to safely charge a capacitor, and the capacitor may be safely charged by regulating the rate at which the DC link capacitor is charged through the at least one resistor.

Also, the discharging part 150 may discharge the current of the charged DC link capacitor. The discharging part 150 may include at least one resistor or ground under the control of the control unit 100 and may safely discharge, through the resistor or ground, the current with which the DC link capacitor is charged.

Meanwhile, the control unit 100 sequentially controls the connected components so that the UPS module 10 can be connected to the load. The control unit connects the commercial power source and the battery to convert an AC current or DC current input from the connected commercial power source or the battery into a DC current having a specific voltage and output the DC current to the load.

To this end, the control unit 100 may control the initial charging part 140 to charge the DC link capacitor until a specific voltage is reached, and the control unit 100 may control the AC circuit breaking part 120, the DC circuit breaking part 110, the AC-to-AC converter 160, and the DC-to-DC converter 170 so that both of the battery and the commercial power source can be connected to the load on the basis of the voltage to which the DC link capacitor is charged.

Figure 2:
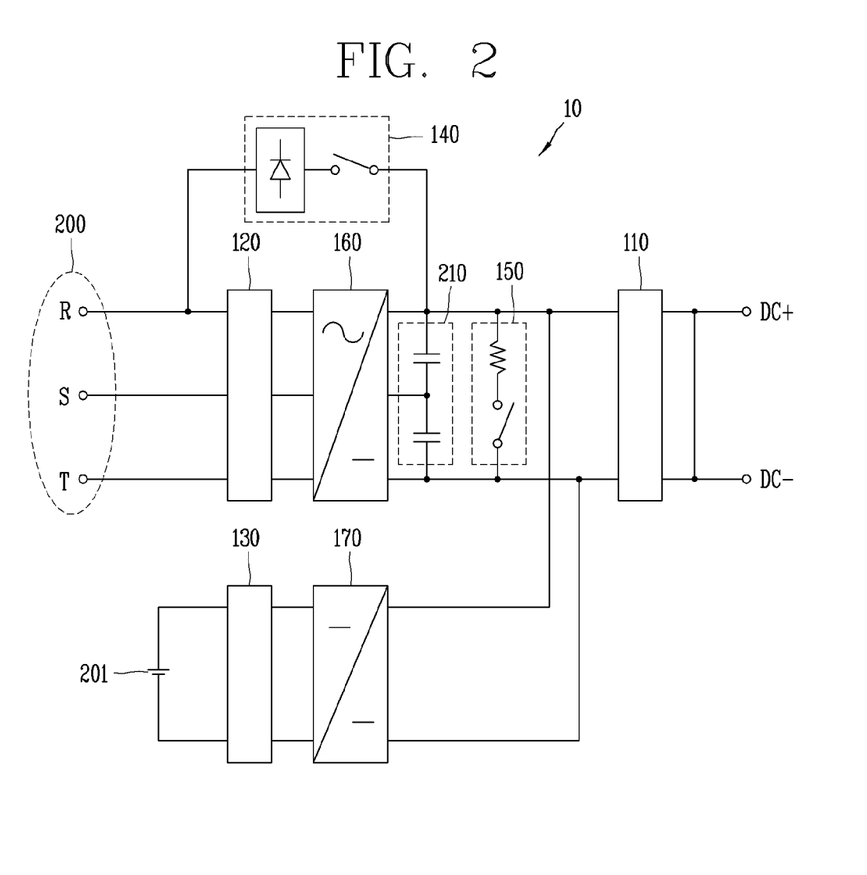
FIG. 2 is a circuit diagram illustrating a circuit structure of the UPS module according to the embodiment of the present invention shown in FIG. 1.

FIG. 2 is a circuit diagram illustrating a circuit structure of the UPS module 10 according to the embodiment of the present invention shown in FIG. 1.

Referring to FIG. 2, the UPS module 10 according to an embodiment may supply DC current supplied from a commercial power source 200 or a battery 201 to a load or a power converter unit connected to the load through DC output terminals DC+ and DC−. Also, the supplied DC current may be input to the load or converted into AC current through the power converter unit connected to the load, thereby becoming a driving source of the load.

In order to supply DC current which is the driving source of the load, the UPS module 10 may include a commercial power source 200 and an AC-to-DC converter 160 configured to convert a three-phase (R-phase, S-phase, and T-phase) AC current input from the commercial power source 200 into a DC current having a preset voltage. Also, an AC circuit breaking part 120 for protecting the AC-to-DC converter 160 and the internal circuit may be included between the AC-to-DC converter 160 and the commercial power source 200 when an abnormality occurs in the commercial power source 200.

The AC circuit breaking part 120 may close the circuit between the commercial power source 200 and the AC-to-DC converter 160 to connect the commercial power source 200 and the AC-to-DC converter 160 or may open the circuit to cut off the connection between the commercial power source 200 and the AC-to-DC converter 160.

Meanwhile, at least one DC link capacitor 210 may be formed on the output terminal of the AC-to-DC converter 160. Here, the DC link capacitor 210 may be connected to the initial charging part 140 and may be charged with the current supplied from the initial charging part 140 until a specific voltage is reached.

Meanwhile, the initial charging part 140 may receive a one-phase current (first-phase current, e.g., R-phase current) of the three-phase AC current of the commercial power source 200. Also, the first-phase current may be supplied to the DC link capacitor 210 to charge the DC link capacitor 210.

More specifically, the initial charging part 140 may be configured to include a switch and at least one rectifier (e.g., a diode) and may supply the first-phase current rectified through the rectifier to the DC link capacitor 210 or cut off the first-phase current from being supplied to the DC link capacitor 210 by closing or opening the circuit between the commercial power source (first phase) and the DC link capacitor 210 under the control of the control unit 100.

Here, the DC link capacitor 210 may further include a discharging part 150. The discharging part 150 may be connected to the DC link capacitor 210 and may include at least one resistor or ground. Also, the discharging part 150 may discharge, through the resistor or ground, the current with which the DC link capacitor 210 is changed by closing the circuit between the DC link capacitor 210 and the resistor or ground under the control of the control unit 100 to connect the DC link capacitor 210 and the resistor or ground.

Also, the UPS module 10 according to an embodiment of the present invention may include the battery 201 and a DC-to-DC converter 170 configured to convert a DC current having a first voltage input from the battery 201 into a DC current having a preset second voltage. Also, a battery circuit breaking part 130 configured to protect the DC-to-DC converter 170 and the internal circuit may be included between the DC-to-DC converter 170 and the battery 201 when an abnormality occurs in the battery 201.

The battery circuit breaking part 130 may close the circuit between the battery 201 and the DC-to-DC converter 170 to connect the battery 201 and the DC-to-DC converter 170 or may open the circuit to cut off the connection between the battery 201 and the DC-to-DC converter 170.

Meanwhile, the output terminal of the DC-to-DC converter 170 may be connected to the output terminal of the AC-to-DC converter 160, in which the DC link capacitor 210 (or the DC link capacitor 210 provided with the discharging part 150) is formed, to form a common output terminal.

Meanwhile, the second voltage, which is the output voltage of the DC-to-DC converter 170, may be equal to the charging voltage of the DC link capacitor 210 charged by the initial charging part 140. In this case, the charging voltage of the DC link capacitor 210 may be a DC bus voltage. When the output voltage of the DC-to-DC converter 170 reaches the DC bus voltage, the output terminal of the DC-to-DC converter 170 and the output terminal of the AC-to-DC converter 160 may be connected to each other. Accordingly, the commercial power source 200 and the battery 201 may be simultaneously connected to a load through a common output terminal.

Meanwhile, the DC circuit breaking part 110 may be provided between the common output terminal and the DC output terminals DC+ and DC−. The DC circuit breaking part 110 may cut off the connection between the load and the output terminal (DC output terminals DC+ and DC−) of the UPS module 10 in the event of an abnormality in the UPS module 10 to protect the load and the internal circuit.

The DC circuit breaking part 110 may close the circuit between the common output terminal and the DC output terminals DC+ and DC− to connect the common output terminal and the DC output terminals DC+ and DC− or may open the circuit to cut off the connection between the common output terminal and the DC output terminals DC+ and DC−.

Figure 3:
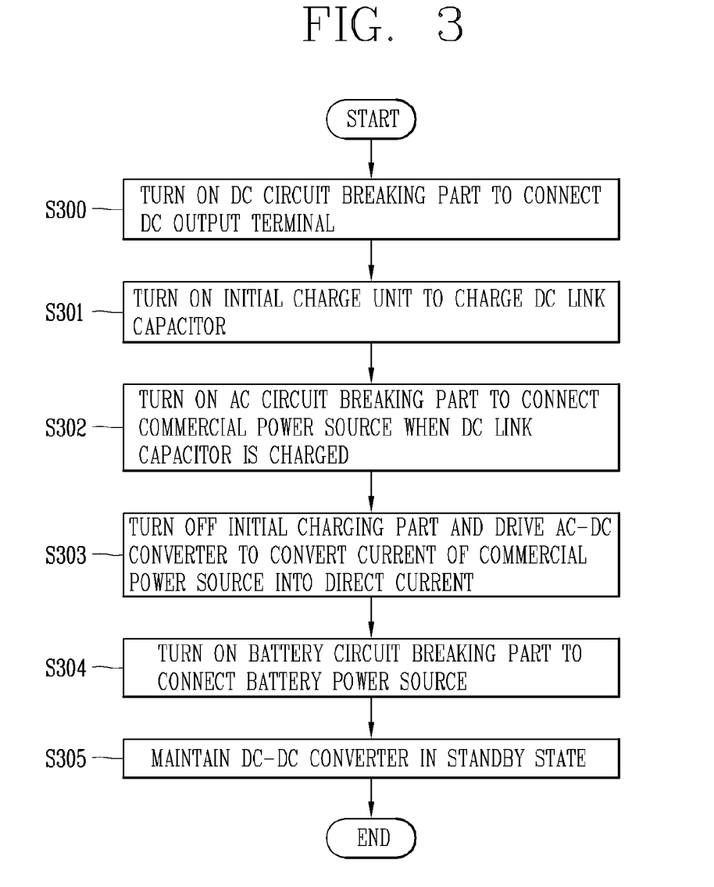
FIG. 3 is a flowchart illustrating an operation process in which initial startup is performed in a UPS module according to an embodiment of the present invention.

FIG. 3 is a flowchart illustrating an operation process in which both the commercial power source 200 and the battery 201 are connected to a load through initial startup in the UPS module 10 with the circuit structure shown in FIG. 2 according to an embodiment of the present invention.

Referring to FIG. 3, first, the control unit 100 of the UPS module 10 according to an embodiment of the present invention may turn on the DC circuit breaking part 110 while both the commercial power source 200 and the battery 201 are separated from the load. Then, the common output terminal to which the output terminal of the DC-to-DC converter 170 and the output terminal of the AC-to-DC converter 160 in which the DC link capacitor 210 is formed are connected may be connected to a load or the DC output terminals DC+ and DC− connected to a power converter unit of the load (S300).

Meanwhile, through operation S300, when the common output terminal is connected to the DC output terminal, the control unit 100 turns on the initial charging part 140 first to connect the circuit between the commercial power source 200 (first phase) and the DC link capacitor 210. Then, the current of the first phase may be supplied to the DC link capacitor 210 to charge the DC link capacitor 210 (S301).

Also, when the charging voltage of the DC link capacitor 210 reaches a preset voltage, i.e., the DC link bus voltage, the control unit 100 may turn on the AC circuit breaking part 120 first (S302). Then, the commercial power source 200 and the AC-to-DC converter 160 may be connected to each other through the AC circuit breaking part 120, and accordingly, the current of the commercial power source 200, that is, the three-phase alternating current may be supplied to the AC-to-DC converter 160.

Also, when the current of the commercial power source 200 is supplied to the AC-to-DC converter 160, the control unit 100 may turn off the initial charging part 140 to cut off the connection between the DC link capacitor 210 and the commercial power source 200 (first phase). Then, the supply of the current to the DC link capacitor 210 may be stopped.

Also, the control unit 100 may control the AC-to-DC converter 160 to convert a current input from the commercial power source 200 into a DC current having a preset voltage (S303). Here, the preset voltage may be the DC link bus voltage, and in this case, a DC current having the same voltage as the DC link bus voltage may be output through the DC link capacitor 210. Also, the current having the DC link bus voltage output from the AC-to-DC converter 160 may be conducted to the DC output terminals DC+ and DC− through the DC circuit breaking part 110. Also, the current having the DC link bus voltage may be supplied to the load or the power conversion unit through the DC output terminals DC+ and DC−.

Meanwhile, when the AC-to-DC converter 160 is driven, the control unit 100 may turn on the battery circuit breaking part 130 (S304). Then, the battery 201 and the DC-to-DC converter 170 may be connected to each other through the battery circuit breaking part 130, and thus the direct current of the battery 201 may be supplied to the DC-to-DC converter 170.

Then, the control unit 100 may control the DC-to-DC converter 170 such that the DC-to-DC converter 170 is driven in a standby state (S305). Also, the control unit 100 may control the DC-to-DC converter 170 to perform current conversion according to whether the supply of the current from the commercial power source 200 is cut off.

That is, the control unit 100 may drive the DC-to-DC converter 170 in the standby state when a current is smoothly supplied from the commercial power source 200, and the control unit 100 may drive the DC-to-DC converter 170 to convert the current of the battery 201 (a current having a primary voltage) into a current having the DC link bus voltage when the supply of the current from the commercial power source 200 is cut off due to an abnormality or failure of the commercial power source 200.

Then, the direct current converted through the DC-to-DC converter 170 may be conducted to the DC output terminals DC+ and DC− through the common output terminal and the DC circuit breaking part 110 and may be supplied to the load or the power conversion unit of the load.

Figure 4:
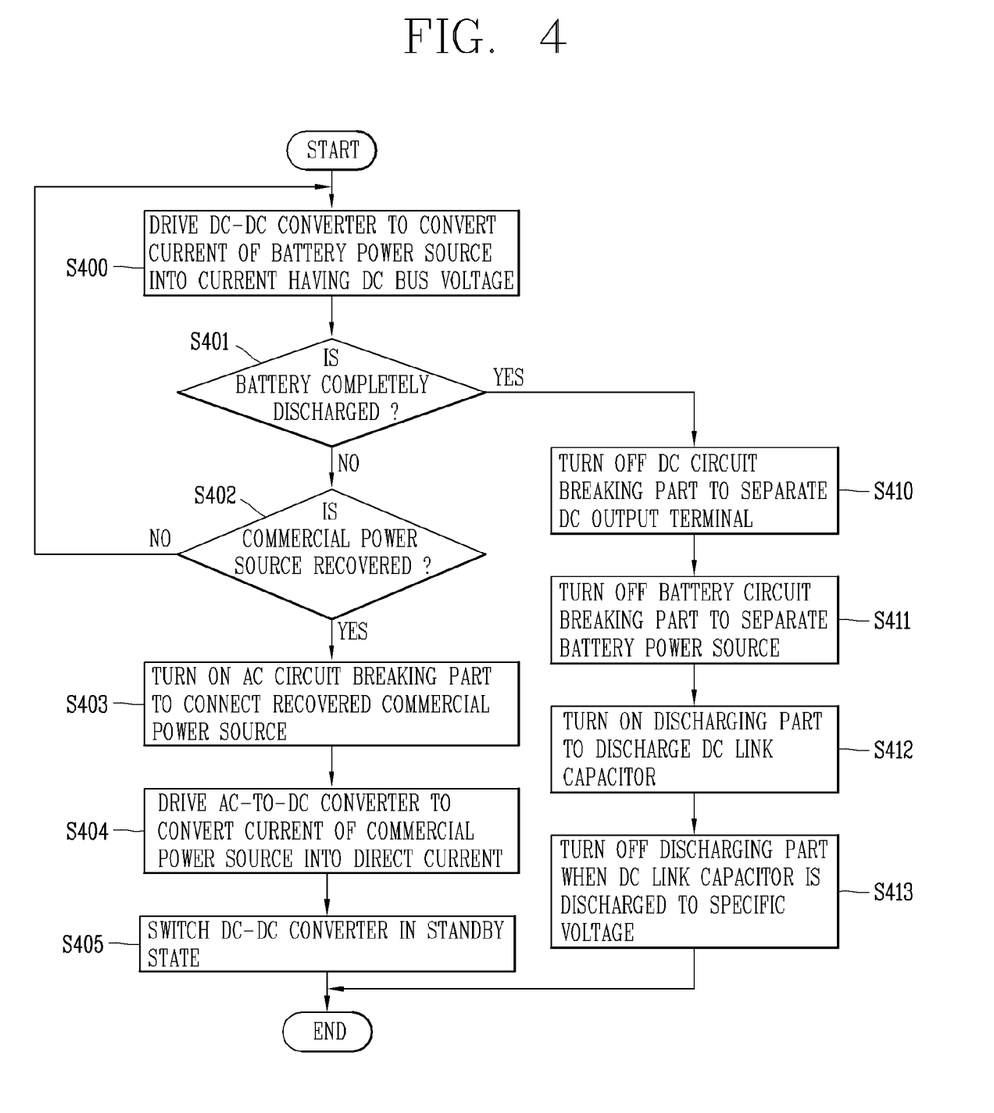
FIG. 4 is a flowchart illustrating an operation process in which utility power is cut off in the UPS module according to an embodiment of the present invention.

Meanwhile, FIG. 4 is a flowchart illustrating an operation process when the commercial power source 200 is cut off due to an abnormality or failure after the UPS module 10 according to an embodiment of the present invention is driven according to the initial startup of FIG. 3.

As an example, when a power abnormality such as an overcurrent occurs or when a failure occurs in the system of the commercial power source 200, the AC circuit breaking part 120 may be turned off to cut off the connection between the commercial power source 200 and the AC-to-DC converter 160. Then, the control unit 100 may drive the DC-to-DC converter 170 to convert a direct current supplied from the battery 201 into a current having the DC link bus voltage (S400). Then, as described above, the direct current converted through the DC-to-DC converter 170 may be supplied to the load or the power conversion unit of the load through the DC circuit breaking part 110.

When the current supplied to the load is supplied from the battery 201, the control unit 100 may detect the remaining power of the battery 201. As an example, the control unit 100 may measure the voltage of the battery 201 and determine the discharge state of the battery 201 on the basis of the measured voltage.

When the determination result of operation S401 is that the remaining voltage of the battery 201 exceeds a preset level, the control unit 100 may detect whether to recover the commercial power source 200 while the current supplied from the battery 201 is supplied to the load (S402). For example, the control unit 100 may detect a current input from the commercial power source 200 through a current sensor provided at an input terminal of the AC circuit breaking part 120 and may determine whether the commercial power source 200 is recovered on the basis of the detected current.

Meanwhile, when the detection result of operation S402 is that the commercial power source 200 is not recovered (the commercial power source 200 is cut off), the control unit 100 may repeat operations S400 to S40S. Accordingly, a state in which the current of the battery 201 is supplied to the load may be maintained.

On the other hand, when the determination result of operation S402 is that the commercial power source 200 is recovered, the control unit 100 may turn on the AC circuit breaking part 120 to connect the commercial power source 200 (S403). As an example, when a current is input from the commercial power source 200 through the current sensor, the control unit 100 may turn on the AC circuit breaking part 120 first to connect the commercial power source 200. In this case, when the current supplied from the commercial power source 200 is a normal current, the AC circuit breaking part 120 may remain turned on, and thus the commercial power source 200 may be connected to the AC-to-DC converter 160. However, when there is a problem with the current supplied from the commercial power source 200 (e.g., an overcurrent), the AC circuit breaking part 120 may be turned off, and in this case, the commercial power source 200 may be cut off again.

Meanwhile, when the AC circuit breaking part 120 is turned on, the commercial power source 200 and the AC-to-DC converter 160 may be connected to each other again. Then, the control unit 100 may control the AC-to-DC converter 160 to drive the AC-to-DC converter 160 such that a three-phase alternating current supplied from the commercial is converted into a direct current having the voltage corresponding to the DC link bus voltage (S404). Then, the direct current output from the AC-to-DC converter 160 may be supplied to the load or the power conversion unit of the load through the DC circuit breaking part 110.

Then, the control unit 100 may switch the DC-to-DC converter 170 into the standby state. Accordingly, the DC-to-DC converter 170 may stop converting the current of the battery 201, thereby stopping power consumption of the battery 201.

Meanwhile, in the above description, it is assumed that the charged state of the DC link capacitor 210 is maintained, but it will be appreciated that when the commercial power source 200 is cut off, at least a portion of the voltage to which the DC link capacitor 210 is charged may be discharged. Thus, the control unit 100 may perform a process of charging the DC link capacitor 210 first before turning on the AC circuit breaking part 120 in operation S403.

In this case, operation S403 may include a process of turning on the initial charging part 140 first to charge the DC link capacitor 210 when the commercial power source 200 is recovered in operation S402. Also, operation S403 may further include a process of turning on the AC circuit breaking part 120 to connect the commercial power source 200 and the AC-to-DC converter 160 when the DC link capacitor 210 is charged to a preset voltage, that is, the DC link bus voltage and turning off the initial charging part 140 to cut off the connection between the commercial power source 200 and the DC link capacitor 210 after the AC circuit breaking part 120 is turned on.

Meanwhile, when the detection result of operation S401 is that the remaining voltage of the battery 201 is less than a preset level, the control unit 100 may turn off the DC circuit breaking part 110 to cut off the UPS module 10 from the load (S410). Thus, when the supply of the current from the UPS module 10 is no longer possible due to the discharge of the battery 201 while the commercial power source 200 is abnormal and the supply of the current is cut off, the current may be supplied to the load through a power supply module connected to another power source (e.g., a standby power source).

Meanwhile, in operation S410, when the UPS module 10 is cut off from the load through the DC circuit breaking part 110, the control unit 100 may turn off the battery circuit breaking part 130 to cut off the connection between the discharged battery 201 and the DC-to-DC converter 170 (S411).

Also, the control unit 100 may turn on the discharging part 150 to connect at least one resistor or ground included in the DC link capacitor 210 and the discharging part 150 to the DC link capacitor 210 (S412). Thus, the current charged in the DC link capacitor 210 is gradually discharged, and accordingly, the charging voltage of the DC link capacitor 210 may also be lowered.

Also, when the voltage of the DC link capacitor 210 is discharged to a preset safe voltage (e.g., 0V or a voltage close to 0V) according to the discharge of the DC link capacitor 210, the control unit 100 may turn off the discharging part 150 (S413). Thus, the discharging part 150 and the DC link capacitor 210 may be short-circuited.

As described above, by discharging a high voltage to which the DC link capacitor 210 is charged when the driving of the UPS module 10 is stopped, the UPS module 10 according to an embodiment of the present invention may prevent damage or accidents due to the high voltage of the DC link capacitor 210.

Meanwhile, although the above-described configuration of FIGS. 1 to 4 shows a configuration in which one UPS module 10 according to an embodiment of the present invention is connected to the load or the power conversion unit of the load. However, it will be appreciated that a plurality of UPS modules according to an embodiment of the present invention may be all connected to the load.

Figure 5:
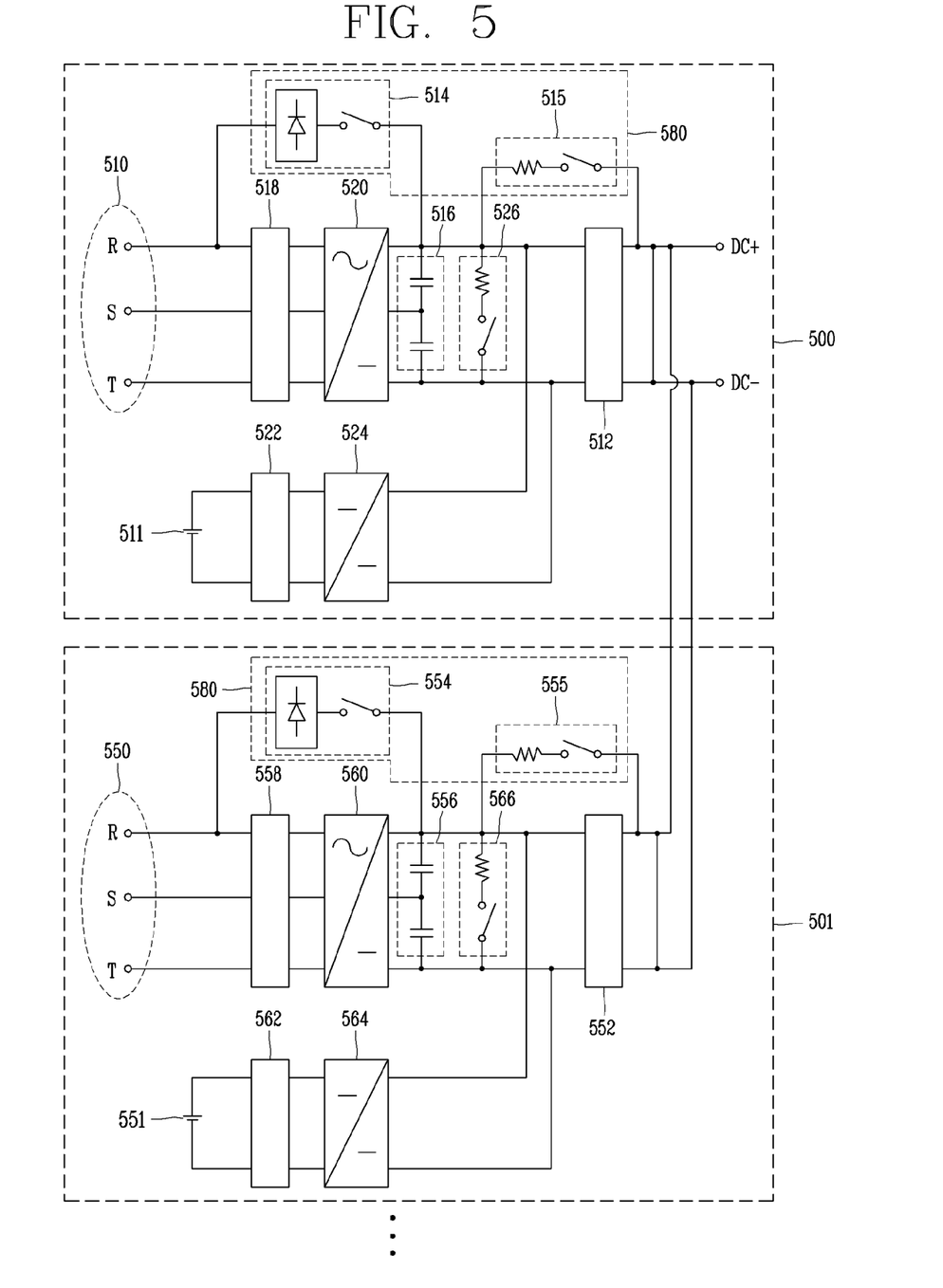
FIG. 5 is a circuit diagram illustrating a circuit structure in which a plurality of UPS modules are connected together to a load according to an embodiment of the present invention.

FIG. 5 is a circuit diagram illustrating a circuit structure in which a plurality of UPS modules according to an embodiment of the present invention are all connected to the load.

Referring to FIG. 5, FIG. 5 shows an example of some (500, 501) of a plurality of UPS modules connected to one DC output terminal DC+ or DC−, and the common output terminals of the UPS modules may be connected to each other through the DC circuit breaking parts 512 and 552 formed in the UPS modules 500 and 501. Here, the common output terminal may be formed in each UPS module by connecting the output terminal of the AC-to-DC converter and the output voltage of the DC-to-DC converter.

When a plurality of UPS modules are all connected to a load, as described above, a current required from the load, that is, a current load may be shared among the plurality of UPS modules. Accordingly, when the plurality of UPS modules are driven together, more stable power may be supplied by lowering the current load.

Meanwhile, when a plurality of UPS modules are driven as described above, at least one UPS module may be disconnected due to failure or maintenance.

For example, when the first module 500 is disconnected due to maintenance or failure while the first module 500 and the second module 501 are connected in common to the DC output terminals DC+ and DC− as shown in FIG. 5, the first AC circuit breaking part 518 and the battery circuit breaking part 552 may be sequentially turned off first to stop the supply of the current from a commercial power source 510 and a battery 511.

Then, similarly to the process from operations S410 to S413 of FIG. 4, a control unit (not shown) of the first module 500 may turn off the first DC circuit breaking part 512 first to cut off the first module 500 from the DC output terminals DC+ and DC−. Then, a current may be supplied to the load through UPS modules other than the first module 500, that is, the remaining UPS modules including the second module 501.

Meanwhile, when the first DC circuit breaking part 512 is turned off, the control unit (not shown) of the first module 500 may turn on a discharging part 526 to connect at least one resistor or ground provided in the discharging part 526 to a first DC link capacitor 516 of the first module 500. Then, the current with which the first DC link capacitor 516 is charged may be discharged.

Subsequently, when the inspection or maintenance of the first module 500 is completed, the first module 500 may turn on the first DC circuit breaking part 512 to connect the DC output terminals DC+ and DC− and the output terminal of the first module 500 again.

However, as described above, in the UPS module according to an embodiment of the present invention, the output current of the battery and the output current of the commercial power source may be connected to each other according to the DC link bus voltage formed through the DC link capacitor. Accordingly, when the alternating current of the commercial power source is input while the DC link bus voltage is not formed by the DC link capacitor, a voltage less than the DC link bus voltage may be output through the AC-to-DC converter.

Accordingly, in order to prevent a direct current having a voltage lower than the DC link bus voltage from being output, the DC link capacitor should be charged first before commercial power source is connected.

To this end, the first module 500 may further include a configuration of the initial charging part connected to the positive terminal DC+ out of the DC output terminals DC+ and DC− connected to the load. In this case, an initial charging part that receives one phase current (first-phase alternating current) among alternating currents of the commercial power source 510 may rectify the first-phase alternating current and supply the rectified current to the first DC link capacitor 516 under the control of the control unit (not shown) of the first module 500. Another initial charging part that is connected to the positive terminal DC+ out of the DC output terminals DC+ and DC− may supply the direct current of the positive terminal to the first DC link capacitor 516 under the control of the control unit (not shown) of the first module 500.

The initial charging part 514 for supplying the alternating current of the commercial power source 510 to the first DC link capacitor 516 will be referred to as an AC initial charging part, and the initial charging part 515 that supplies the direct current of the positive terminal DC+ out of the DC output terminals DC+ and DC− to the first DC link capacitor 516 will be referred to as a DC initial charging part.

As described above, the initial charging part of the UPS modules 500 and 501 according to an embodiment of the present invention may have a configuration including the DC initial charging part 515 in addition to the AC initial charging part 514. In this case, as described above, when the first module 500 is disconnected from the load for inspection or maintenance and then is connected again, the first AC circuit breaking part 518 and the battery circuit breaking part 522 are turned off, and thus the DC output terminals DC+ and DC− have higher voltages.

In this case, the control unit of the first module 500 may turn on the DC initial charging part 515 to close the circuit between the first DC link capacitor 516 and the positive terminal DC+ out of the DC output terminals DC+ and DC−. Then, the positive terminal DC+ and the first DC link capacitor 516 may be connected, and a DC voltage may be supplied from the positive terminal DC+ to the first DC link capacitor 516.

Meanwhile, when the first DC link capacitor 516 is charged to a preset DC link bus voltage, the control unit of the first module 500 may turn on the first AC circuit breaking part 518 to connect the commercial power source 510 to the AC-to-DC converter 520. Then, the AC-to-DC converter 520 may convert an alternative current input from the commercial power source 510 into a direct current having the DC link bus voltage through the first DC link capacitor 516 and output the direct current.

Meanwhile, when the first AC circuit breaking part 518 is turned on, the control unit of the first module 500 may turn off the DC initial charging part 515. Also, the control unit of the first module 500 may turn on the first battery circuit breaking part 130 to input the current of the battery 511 to the first DC-to-DC converter 524 and drive the first DC-to-DC converter 524 in the standby state. Then, a plurality of UPS modules including the first module 500 may share current required from the load, that is, a current load.

As described above, by allowing the output current of the battery and the output current of the commercial power source to be connected to each other according to the DC link bus voltage formed through the DC link capacitor in the UPS module according to an embodiment of the present invention, it is possible to unify the internal structure of the UPS module. Meanwhile, for such a unified structure, the UPS module according to an embodiment of the present invention may allow the DC link capacitor to be charged first before a commercial power source is connected.

Meanwhile, the DC link capacitor is charged through an initial charging part that supplies a current to the DC link capacitor, and the initial charging part may receive a current from different current supply sources depending on whether the UPS module is initially started while there is no current supplied to the load or is restarted while another UPS module is connected to the load, i.e., while there is a direct current supplied to the load and may charge the DC link capacitor with the current. As an example, the control unit of the UPS module may determine whether there is another UPS that supplies a current to the load through a current sensor formed at the DC output terminals DC+ and DC− or a feedback signal provided from another UPS module connected to the load, that is, whether there is a current supplied to the load.

In more detail, the UPS module according to an embodiment of the present invention may receive a current from the commercial power source and charge the DC link capacitor at the time of an initial startup and may receive a current input to the load and charge the DC link capacitor at the time of a restart. To this end, the initial charging part may have a configuration including a charging part (AC initial charging part) for charging the DC link capacitor by including at least one rectifying element capable of rectifying the alternating current of the commercial power source and a charging part (DC initial charging part) for charging the DC link capacitor by receiving a current input to the load.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet).

The computer may include the controller 100. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An uninterruptible power source (UPS) module comprising:
    an alternating current (AC) to direct current (DC) converter configured to convert an alternating current of a commercial power source into a direct current;
    a DC-to-DC converter configured to convert a direct current of a battery into a direct current having a different voltage;
    a common output terminal to which an output terminal of the AC-to-DC converter and an output terminal of the DC-to-DC converter are connected through a link capacitor having a preset bus voltage;
    a first circuit breaker formed between the common output terminal and a load and configured to open or close a circuit between the common output terminal and the load;
    a second circuit breaker configured to open or close a circuit between the commercial power source and the AC-to-DC converter;
    a third circuit breaker configured to open or close a circuit between the battery and the DC-to-DC converter;
    a means for initial charging configured to charge the link capacitor; and
    a control unit configured to close the first circuit breaker to connect the common output terminal and the load when the UPS module is started, control the means for initial charging to charge the link capacitor, and sequentially close the second circuit breaker and the third circuit breaker when the bus voltage is formed along with the charging of the link capacitor.

2. The UPS module of claim 1, wherein the means for initial charging comprises:
    a first charging means configured to receive an alternative current and charge the link capacitor; and
    a second charging means configured to receive a direct current and charge the link capacitor.

3. The UPS module of claim 2, wherein
the first charging means is formed to receive any single-phase current out of a multi-phase alternating current supplied from the commercial power source and charge the link capacitor, and
the second charging means is formed to receive a current of a positive terminal out of output terminals of the UPS module connected to the load and charge the link capacitor.

4. The UPS module of claim 2, wherein the control unit controls the means for initial charging such that the link capacitor is charged through another charging part according to whether there is a direct current supplied to the load when the UPS module is started.

5. The UPS module of claim 4, wherein
the control unit controls the means for initial charging such that the link capacitor is charged through the first charging means when there is no current supplied from other UPS modules to the load when the UPS module is started, and
the control unit controls the means for initial charging such that the link capacitor is charged through the second charging means when there is a current supplied from other UPS modules to the load.

6. The UPS module of claim 1, wherein
when the second circuit breaker is closed to connect the circuit between the commercial power source and the AC-to-DC converter, the control unit turns off the means for initial charging to stop supplying the current to the link capacitor before the third circuit breaker is closed, and
when the initial charge unit is turned off, the control unit closes the third circuit breaker to connect the circuit between the battery and the DC-to-DC converter.

7. The UPS module of claim 1, wherein
the control unit drives the DC-to-DC converter in a standby state when both the first circuit breaker and the second circuit breaker are closed, and
the control unit controls the DC-to-DC converter to convert the direct current of the battery into a direct current having the bus voltage when the second circuit breaker is opened while the first circuit breaker is closed.

8. The UPS module of claim 1, further comprising a discharging part configured to discharge the charging voltage of the link capacitor,
wherein the first to third circuit breakers are all opened, the control unit connects the discharging part to the link capacitor to discharge the current charged in the link capacitor.

9. A method of controlling an uninterruptible power source (UPS) module, the method comprising operations of:
controlling a first circuit breaker formed between an output terminal of the UPS module and a load to connect the output terminal of the UPS module and the load when the UPS module is started;
charging a link capacitor to a preset bus voltage by controlling a means for initial charging to charge the link capacitor;
controlling a second circuit breaker formed between a commercial power source and an alternating current (AC) to direct current (DC) converter for converting an alternating current input from the commercial power source into a direct current to connect the commercial power source and the AC-to-DC converter when the link capacitor is charged to the bus voltage;
turning off the means for initial charging to stop supplying the current to the link capacitor when the commercial power source and the AC-to-DC converter are connected;
controlling the AC-to-DC converter to convert the alternating current of the commercial power source into a direct current having a voltage corresponding to the bus voltage;
controlling a third circuit breaker formed between a battery and a DC-to-DC converter for converting a direct current input from the battery into a direct current having a voltage corresponding to the bus voltage to connect the battery and the DC-to-DC converter; and driving the DC-to-DC converter in a standby state when the DC-to-DC converter and the battery are connected.

10. The method of claim 9, wherein the operation of charging the link capacitor to the preset bus voltage comprises operations of:
determining whether there is a direct current supplied to the load; and
controlling the means for initial charging when there is a direct current supplied to the load to charge the link capacitor with the direct current supplied to the load and controlling the means for initial charging when there is no direct current supplied to the load to charge the link capacitor with the alternating current supplied from the commercial power source.

11. The method of claim 9, further comprising operations of:
controlling the DC-to-DC converter to convert the direct current of the battery into a direct current having the bus voltage when the second circuit breaker is opened to cut off the commercial power source;
further detecting whether the commercial power source is recovered when the current of the battery is converted into a direct current having another voltage through the DC-to-DC converter;
connecting the commercial power source and the AC-to-DC converter by closing the first circuit breaker when the commercial power source is recovered; and
recovering the DC-to-DC converter to a standby state.

12. The method of claim 11, wherein the operation of further detecting whether the commercial power source is recovered comprises operations of:
further detecting a discharge state of the battery;
opening the first circuit breaker to cut off an output terminal of the UPS module from the load according to the discharge state of the battery;
opening the third circuit breaker to cut off the battery from the DC-to-DC converter when the first circuit breaker is opened; and
connecting a discharging part including at least one resistor or ground to the link capacitor to discharge the voltage charged in the link capacitor when the third circuit breaker is opened.

13. The method of claim 11, wherein the operation of connecting the commercial power source and the AC-to-DC converter comprises operations of:
controlling the means for initial charging to charge the link capacitor to a preset bus voltage when the commercial power source is recovered; and
controlling the second circuit breaker to connect the commercial power source and the AC-to-DC converter when the link capacitor is charged to the bus voltage.

* * * * *